US008665885B2

(12) United States Patent
Pastorino et al.

(10) Patent No.: US 8,665,885 B2
(45) Date of Patent: Mar. 4, 2014

(54) INDICATION OF SERVICE AVAILABILITY FOR A USER TERMINAL

(75) Inventors: Paolo Pastorino, Turin (IT); Luca Giacomello, Turin (IT)

(73) Assignee: Telecom Italia S.p.A., Milan (IT)

(*) Notice: Subject to any disclaimer, the term of this patent is extended or adjusted under 35 U.S.C. 154(b) by 0 days.

(21) Appl. No.: 11/988,026

(22) PCT Filed: Jun. 28, 2005

(86) PCT No.: PCT/EP2005/006943
§ 371 (c)(1),
(2), (4) Date: Feb. 11, 2009

(87) PCT Pub. No.: WO2007/000175
PCT Pub. Date: Jan. 4, 2007

(65) Prior Publication Data
US 2009/0196302 A1    Aug. 6, 2009

(51) Int. Cl.
*H04L 12/28* (2006.01)
*H04L 12/56* (2011.01)
*H04W 4/00* (2009.01)
*H04J 3/17* (2006.01)
*H04J 3/16* (2006.01)
*H04J 3/22* (2006.01)

(52) U.S. Cl.
USPC ............ 370/401; 370/329; 370/433; 370/468

(58) Field of Classification Search
USPC .......... 370/328, 329, 400, 401, 431, 443, 468
See application file for complete search history.

(56) References Cited

U.S. PATENT DOCUMENTS

| | | | |
|---|---|---|---|
| 6,131,046 A | 10/2000 | Sano et al. | |
| 6,389,005 B1 * | 5/2002 | Cruickshank | 370/352 |
| 6,683,853 B1 * | 1/2004 | Kannas et al. | 370/237 |
| 6,704,289 B1 | 3/2004 | D'Souza et al. | |
| 6,751,664 B1 | 6/2004 | Kogan et al. | |
| 6,789,110 B1 | 9/2004 | Short et al. | |
| 7,433,836 B1 * | 10/2008 | August et al. | 705/34 |
| 7,876,745 B1 * | 1/2011 | Stewart et al. | 370/356 |
| 2001/0043577 A1 * | 11/2001 | Barany et al. | 370/328 |
| 2002/0075875 A1 | 6/2002 | Dravida et al. | |
| 2002/0138613 A1 | 9/2002 | Garg et al. | |
| 2003/0005148 A1 | 1/2003 | Mochizuki et al. | |
| 2003/0014538 A1 * | 1/2003 | Roadknight et al. | 709/238 |
| 2003/0058851 A1 * | 3/2003 | Goldman | 370/389 |
| 2003/0202476 A1 * | 10/2003 | Billhartz et al. | 370/236 |

(Continued)

FOREIGN PATENT DOCUMENTS

| | | | | |
|---|---|---|---|---|
| DE | WO2009100764 | * | 8/2009 | ............ H04L 12/56 |
| WO | WO 00/14919 | | 3/2000 | |

(Continued)

*Primary Examiner* — Ronald Abelson
(74) *Attorney, Agent, or Firm* — Finnegan, Henderson, Farabow, Garrett & Dunner, L.L.P.

(57) ABSTRACT

Disclosed herein is a method for providing a user with an indication of availability of a service at a user terminal, the user terminal being connected to a gateway via a first communications link, and the gateway being connected to a service provider via a second communications link. The method includes determining a service bandwidth demand, a bandwidth availability, and a service priority; determining a service availability based on the service bandwidth demand, the bandwidth availability, and the service priority; and providing the user with an indication of the service availability.

23 Claims, 2 Drawing Sheets

(56) References Cited

U.S. PATENT DOCUMENTS

| | | | |
|---|---|---|---|
| 2004/0030797 A1* | 2/2004 | Akinlar et al. | 709/232 |
| 2004/0133627 A1* | 7/2004 | Kalyanaraman et al. | 709/201 |
| 2004/0261094 A1* | 12/2004 | Huslak et al. | 725/25 |
| 2005/0059350 A1 | 3/2005 | Sano | |
| 2005/0083899 A1* | 4/2005 | Babbar et al. | 370/342 |
| 2007/0124689 A1* | 5/2007 | Weksel | 715/752 |

FOREIGN PATENT DOCUMENTS

| | | | | |
|---|---|---|---|---|
| WO | WO 02/14977 A2 | 2/2002 | | |
| WO | WO 02/14977 A3 | 2/2002 | | |
| WO | WO2007000175 | * | 1/2007 | H04L 12/56 |

* cited by examiner

INDICATION OF SERVICE AVAILABILITY FOR A USER TERMINAL

CROSS REFERENCE TO RELATED APPLICATION

This application is a national phase application based on PCT/EP2005/006943, filed Jun. 28, 2005, the content of which is incorporated herein by reference.

TECHNICAL FIELD OF THE INVENTION

The present invention relates in general to indication of service availability for a user terminal, and in particular to a method and system for providing a user with an indication of the quality of a service or class of services at a user terminal.

BACKGROUND ART

As is known, with the increasing spread of new services that make use of wide-bandwidth connections and have their point of utilization in the home network, there is a pressing need for simultaneous applications to coexist, sharing the same resources, at the quality declared by the service provider and undersigned by the customer. This need is markedly felt not only because it responds to the requirements of the customer of exploiting to the full the potential of the wide-bandwidth connection that the customer has purchased, but also, on the operator side, because it represents an unrenounceable requirement, for guaranteeing the highest possible availability of the service that is provided and billed. The co-existence with other applications that the customer can manage autonomously must not jeopardize the quality of the service provided, and much less so the co-existence with other applications over which the operator has direct control.

There thus arises the need to implement mechanisms that will guarantee the so-called "Quality of Service" (QoS), i.e., the possibility of guaranteeing the availability (reliability over time) of the service according to what has been agreed upon in the contract with the customer not only as regards the part of network dedicated to transport and access, but also as regards the part of network over which the operator has much less control, namely, the home network.

A solution is disclosed in US 2002/138613, which proposes follow-up notification of availability of requested application service and bandwidth between client(s) and server(s) over any network, in particular controlling service and bandwidth on a network that may provide orderly service delivery to client machines that request a service. In particular, this document discloses a method for providing orderly service delivery to clients over a network, comprising the steps of requesting data from a location, and, if a denial is received, notifying a particular client of availability.

U.S. Pat. No. 6,751,664 discloses a method for monitoring and meeting customer bandwidth demand in operational IP data networks, based on comparison of mean access router uplink utilization to a prescribed threshold value that is computed based upon granular measurements of uplink utilization. This provides an indication of whether customer demand is met with a statistical confidence. Further, the actually measured access router uplink utilization can be used to make a predictive assessment of whether to provision a new customer on the access router without adversely affecting existing customers.

U.S. Pat. No. 6,704,289 discloses a method for monitoring service availability and maintaining customer bandwidth in a connectionless (IP) data network, based on measure of network accessibility and network continuity (in Defects Per Million) via an accessibility measurement instrumentation device and a continuity measurement instrumentation device. The accessibility and continuity measurements are combined via a mechanism to yield a service unavailability measure that is then compared to a threshold value, representing the applicable customer unavailable bandwidth specified under a service level agreement specification. If the actual service unavailability exceeds the allowable unavailable customer bandwidth under the service level agreement, then an event correlation device will correlate the service unavailability measure with network fault and performance alarm information from network alarms to establish a root cause. Once the route cause is established, a trouble ticket system generates a trouble ticket to facilitate network restoration.

The Applicant observes that none of the above-described solutions provides a user with the perception of the availability of the service that he/she is trying to access. Moreover, the Applicant notes that all the above documents describe operations and functionalities to be applied along the network and do not involve the user's destination devices.

U.S. Pat. No. 6,131,046 proposes altering displayed keys to indicate availability of service for a communications apparatus. In particular, this document discloses a communications apparatus which has a man/machine interface to prevent or dissuade a user from performing a wasteful calling operation. In one implementation, the communications apparatus is suitable for transmission and reception and includes a display unit for displaying a content associated with a communication operation, a detector for checking whether a communication is available based upon a reception signal, and a display controller for inhibiting the unit from displaying the content when the communication is unavailable.

The Applicant observes that in this solution the customer has not the perception of the available quality of the communication that he/she will have at his/her disposal.

Moreover, the Applicant observes that this document provides a solution dedicated to portable telephone communication systems, which is not suitable to be applied in a contest such that of residential or business data network systems. In fact, the technique described in U.S. Pat. No. 6,131,046 requires that the user's terminal (mobile phone) is constantly in reception of the RF signal sent by a radio base station in order to understand (through the intensity detected on a control channel) if communication is available. In a residential or business data network systems, when no service is being delivered to the system, there is no external signal that can be used to monitor the possible quality of service.

US 2005/0059350 A1 discloses a display terminal for use with a radio LAN system that allows for access to a number of different received data. The LAN system further comprises a base apparatus, which includes an antenna for radio communication with the display terminal. The display terminal is able to display a signal reception quality level, determined by calculation of the bit error rate per unit time of the received digital data. When the reception quality is low, the user can change the reception location.

The Applicant observes that the signal quality indication provided by the terminal is based only on the variability of the bit error rate of the received signal as a function of the position of the terminal itself. The technique proposed in US 2005/0059350 A1 is therefore unsuitable to provide indications on the availability and the possible quality of a service before the service is accessed, in particular in a system suitable to deliver different telecommunication services to a plurality of residential apparatuses connected to a same gateway.

OBJECT AND SUMMARY OF THE INVENTION

With reference to systems for the delivery of telecommunication service(s) to the customer premises, the Applicant has tackled the problem of providing the local users with an indication of the availability and/or the quality of the service(s) at the user terminal.

The Applicant has found that, in a system including a service provider, a domestic gateway and at least a user terminal connected to the gateway, an indication of the service availability can be provided to the user by first determining a bandwidth demand for each of the services that can be accessed by the user, then determining a bandwidth availability on the connection to the user, and finally determining the service availability based on the service bandwidth demand and the bandwidth availability.

In this way, the entire set of network parameters (wireless coverage, bandwidth, QoS, priority, etc.) can be made intelligible to the customer in a single modality and interface linked to the quality of the service (such as the quality of the video streaming in the case of a video player).

In broad outline, when the user terminal is switched on, it sends to the gateway a request of availability for each service available at the user terminal. For each service, the gateway then verifies, on the one hand, the bandwidth availability of the public communication network through which it is connected to a service provider, and, on the other hand, the bandwidth availability of the customer-premises communication network, through which it is connected to the user terminal, along with the priority of each individual service. The gateway then computes and sends the user terminal the quality available for each individual service, among a number of possible levels, for example, high quality, medium availability, low quality, or unavailability, and the quality available for each individual service is then displayed on the display terminal or on a display connected to the user terminal, and dynamically updated periodically, for example, every minute, or even more frequently, based on the real-time characteristics of activation of a potentially activatable service. If the service is provided at just one quality, the indications displayed may be simply that of availability or unavailability.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
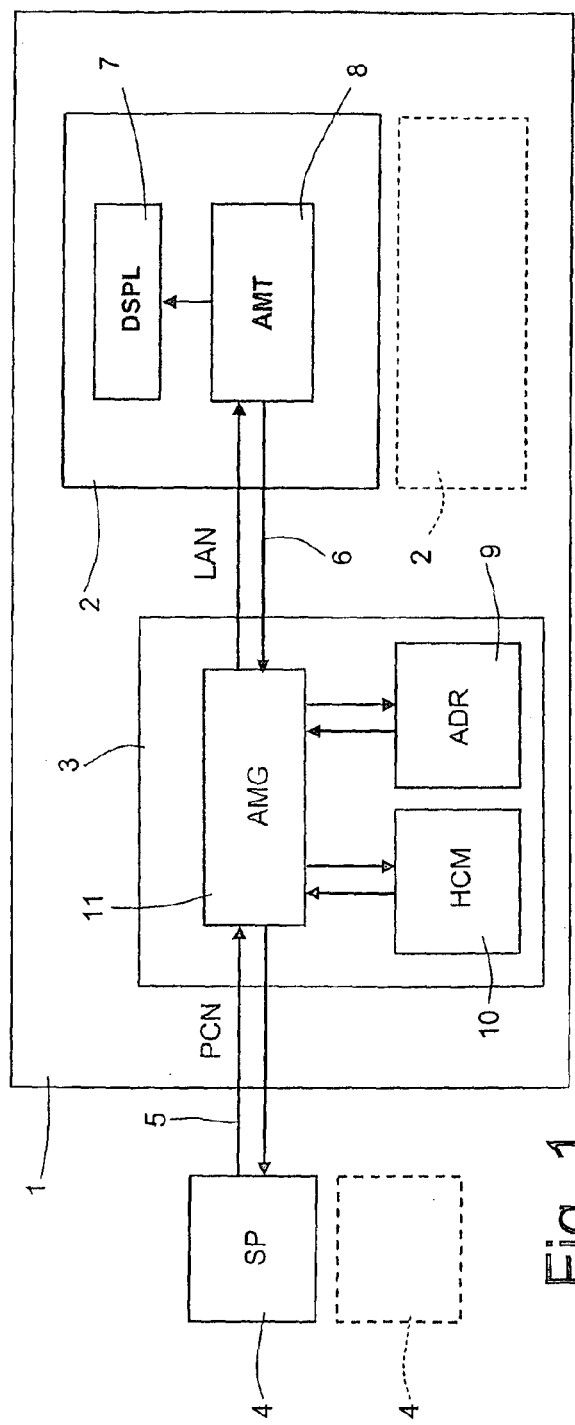
FIG. 1 shows a block diagram of a basic architecture of a customer-premises network implementing the present invention.

FIG. 1 shows a block diagram of a customer-premises network 1, for example a home network, including one or more user terminals 2 and a gateway 3, both so designed as to implement the present invention.

In particular, the gateway 3 is connected, on the one hand, to one or more service providers (SP) 4 via a communication link defined by a public communication network (PCN) 5 managed by a telecommunications operator, and, on the other hand, to the user terminals 2 via another communication link defined by a Local Area Network (LAN) 6. In more detail, each user terminal 2 may be connected to the gateway 3 via either a wired communications link (e.g., Ethernet, USB, etc.) or a wireless communications links, and may share the communications link through which it is connected to the gateway 3 with other user terminals 2 or personal computers in an "all-IP" network. Therefore, two different user terminals 2 may be connected to the gateway 3 via the same communication link or via respective and different communication links.

The user terminal 2 may be of any type so designed as to run one of more software applications by means of which the user terminal 2 connects, via the gateway 3, to the service provider(s) (that may be either the same as, or different than the telecommunications operator that manages the public communication network 5) and access corresponding services, typically including audio and/or video services. For example, the user terminal 2 may be an IP phone, a UMTS mobile phone, a set-top box, a personal computer, a portable media player, a pocket PC, etc. Besides, each user terminal 2 may be either provided with, or connected to a display 7, on which the visual indication of the availability of each service is provided.

In order to implement the invention, the user terminal 2 in provided with a software module, hereinafter referred to as Availability Manager on Terminal (AMT) 8, whereas the gateway 3 in provided with three software modules, hereinafter referred to as Application Data Repository (ADR) 9, Home Connection Monitor (HCM) 10, and Availability Manager on Gateway (AMG) 11. The Availability Manager on Gateway 11 is in communication with the Application Data Repository 9, the Home Connection Monitor 10 and the Availability Manager on Terminal 8.

The Availability Manager on Terminal 8 is so designed as to send to the Availability Manager on Gateway 11 a request of availability for each service available at the respective user terminal 2. For example, the request of availability can be sent through XML messages after opening of an HTTP session.

The Availability Manager on Terminal 8 is also so designed as to receive from the Availability Manager on Gateway 11 the quality availability of each service, and to convert it into an appropriate visual indication on the display 7.

The Application Data Repository 9 is so designed as to contain information about the services available at all the user terminals 2 in the customer-premises network 1 and for which a visual indication of the service availability is to be provided. In particular, the Application Data Repository 9 preferably stores for each service the following information:

type of physical subnetwork (type of connection) used by each user terminal 2. In this way, the Application Data Repository 9 can make statistics about delivery of services to individual user terminals 2;

priority of the service. Apart from the possible marking of the traffic at an IP level, which can be in some way forced by user terminals or applications running on the user terminals 2, three levels of priority may be hypothesized:
best effort;
guaranteed-quality user application;
guaranteed-quality operator application; and
peak and average bandwidth demand for the guaranteed-quality services; in particular the bandwidth demand for the high quality services, medium quality services and low quality services.

In the following description, the word "bandwidth" will mean the amount of data that can be transferred through a digital connection in a given time period (i.e., the connection's bit rate), which is usually measured in bits or bytes per second.

The information regarding peak and average bandwidth demand and priorities of the services may be provided to the Application Data Repository 9 either by the user terminals 2 upon turning-on of the latter in the customer environment, or by the service provider during the service provisioning (or both together).

The Home Connection Monitor 10 is so designed as to monitor the physical connections originating from the gateway 3, in particular to instantaneously determine what is the bandwidth occupancy and, based on that, what is the bandwidth availability of the connections (USB, Ethernet and Wireless) managed by the gateway 3. In the wireless case, the Home Connection Monitor 10 may moreover be able to update dynamically the value of the total bandwidth availability according to the effective situation of coverage.

The Availability Manager on Gateway 11 is so designed as to receive from the Availability Manager on Terminal 8 a request of availability for each service available at the user terminals 2 (these services may be either operator-controlled or customer-controlled ones). Moreover, the Availability Manager on Gateway 11 is designed to interrogate the Application Data Repository 9 and the Home Connection Monitor 10 to obtain information about:
the type of physical subnetwork used by the services. It is assumed, for the sake of simplicity, that the user terminals 2 are connected to the gateway 3 without any bridge, i.e., by a direct link. Considering a user terminal 2 on loan for use or in any case sponsorized by the service provider or operator, this assumption should cover the majority of actual cases;
the instantaneous bandwidth availability of the network links;
the bandwidth demand of each individual service with a high, medium and low service quality; and
the priorities of the various services.

Based on this information, the Availability Manager on Gateway 11 decides whether a service is available or not at a user terminal 2, and, if so, whether the service is available at a high, medium or low quality. In the case of a fixed-quality application, the Availability Manager on Gateway 11 simply decides whether a service is available or not at a user terminal 2. The Availability Manager on Gateway 11 then notifies the decision to the Availability Manager on Terminal 8, providing at the same time the quality of the service (high, low or medium or else unavailability).

Figure 2:
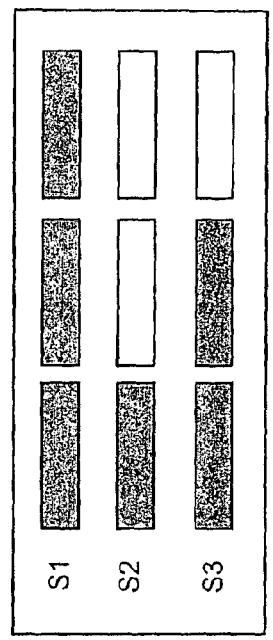
FIG. 2 shows an example of visual indications of levels of quality available for services available at a user terminal.

FIG. 2 shows an example of indications of the availability of three services displayed on the display 7 of a user terminal 2. For each available service, a dedicated broken display line (i.e., a segmented line) indicates the available quality, according to the number of segments that are lit up. In particular, if no segment is lit up, this means that the service is unavailable, if only the first segment is lit up, this means that the service is available with low quality, if only the two first segments are lit up, this means that the service is available with medium quality, and if all the three segments are lit up, this means that the service is available with high quality.

In the case of service unavailability, the Availability Manager on Terminal 8 may send to the Availability Manager on Gateway 11 a "booking" message in such a way that, when the bandwidth becomes free and the priority enables availability of the service, this availability will be notified to the user terminal 2, asynchronously and independently of the periodic requests of availability sent by the latter. The change of status of availability of a service could be displayed on the user terminal 2 by making the broken display line flash. On the Availability Manager on Gateway 11, a mechanism for managing the booking queues should be implemented.

Besides, the quality available for each service at the user terminal 2 is also shared with the other services available at the user terminal 2 that may need to know this information. For example, in the case of video streaming, the video player uses this information to forward a request of streaming at the correct bit rate to the server that supplies the contents.

Periodically, for example every 20-30 seconds or even one minute, according to the services, the Availability Manager on Terminal 8 re-send a request of availability for each service and updates the visual indication on the display 7, if necessary accompanying the possible change of status of availability with flashing of the corresponding indicator for a few seconds. Also this information is to be shared with the other services, for example for activating any possible signaling to the user in relation to the risk of deterioration of the quality of the service (in the case where, for fortuitous reasons, a radio link deteriorates and the application can no longer be used with the streaming quality provided by the server).

Hereinafter there will be briefly described three possible examples of services available at a user terminal 2.

A) Audio Streaming

When the user selects the Internet radio option on a dedicated user terminal 2, a broken line appears on the display 7 of the user terminal 2, with three non-lit up segments.

The service of audio streaming can be provided, for example, at three quality levels: 32 kbit/s (basic), 128 kbit/s (CD-quality), or 384 kbit/s (high quality). Upon turning-on of the user terminal 2, the exchange of information between the gateway 3 and the user terminal 2 starts and none, one, two or all of the three segments are lit up.

In particular:
none of the segments are lit up if the bandwidth available for the service is less than 32 kbit/s (corresponding, for example, to a code 01 provided by the Availability Manager on Gateway 11 to the Availability Manager on Terminal 8);
one segment is lit up if the bandwidth available for the service is between 32 and 128 kbit/s (corresponding, for example, to the code 02 provided by the Availability Manager on Gateway 11 to the Availability Manager on Terminal 8);
two segments are lit up if the bandwidth available for the service is between 128 and 384 kbit/s (corresponding, for example, to the code 03 provided by the Availability Manager on Gateway 11 to the Availability Manager on Terminal 8); and
all the three segments are lit up if the bandwidth available for the service is equal to or grater than 384 kbit/s (corresponding, for example, to the code 04 provided by the Availability Manager on Gateway 11 to the Availability Manager on Terminal 8).

This information received by the Availability Manager on Terminal 8 may also be transmitted to other software applications, which in turn may exploit it. For example, the information may be sent to the software application that manages the list of the available radio stations and their selection, which can, for example, start an appropriate messaging.

B) Concurrent Audio/Video Streaming

Let's consider a scenario where a first user switches a video player 2 on and connects up to a provider 4 to watch a movie, and simultaneously another user in the same premises switches a set-top box 2 on and connects up to the same or another provider 4 to watch a live football match. If both the set-top box 2 and the video player 2 are wirelessly connected to the same access point residing on the gateway 3, they may share the same communications link. The movie and live football match, however, have different priorities since the latter has a higher priority than the former, which is in any case resident on a server and may possibly be buffered at reception.

Since the video player 2 also enables radio listening via the Internet, two broken lines appear on the display 7 of the video player 2, each with three non-lit up segments, one broken line being labeled "Video", and the other "Audio".

Both the video streaming and the audio streaming can be performed at three different bit rates corresponding to three audio/video quality levels. Therefore, when a request of availability of the service is sent by the video player 2 to the gateway 3, an exchange of information takes place between the gateway 3 and the video player 2, from which updating of the display 7 derives. Assuming that the bandwidth occupancy of the streaming of the live football match (as encoded by the provider) is 1.5 Mbit/s, when the football match is being played on the set-top box then the residual bandwidth available for the movie is calculated based on this information, which is not modifiable given the higher priority of the live football match (possibly, encoding at different bit rates and hence different levels of quality can be made available by the provider 4).

The first user may consequently see on the display 7 of the video player 2 different indications of availability of the two services (audio and video), according to the residual bandwidth available for the radio link, a parameter that depends directly upon the position of the video player 2 inside the customer premises.

Thus, for example, if the first user arranges the video player 2 far from the gateway 3 so that only low bandwidth is available, the video service could for example be unavailable and the audio service (if this is independent of the video service) could be, for example, available only at a low quality. This situation would be displayed to the user by an appropriate lighting of the broken lines associated with the two services. If the first user moves the video player 2 closer to the gateway 3 so that medium bandwidth is available, after a few seconds, the video and audio services could be received, for example, with low quality and high quality, respectively, and the indications on the display 7 of the video player 2 would be updated accordingly. A few seconds after the live football match has finished, also far from the gateway 2, the user could see an indication of high-quality availability for both of the services. Therefore, the quality of the delivered services may change in time as a result of varying local communication conditions and of competitions between different services.

It should be noted that each visual indication refers to one service taken independently of the other; namely, if the indication is of high quality available for both of the services, this does not mean that they can both be accessed at a high quality simultaneously. In fact, when the check for available bandwidth is made, none of them are effectively provided and therefore the maximum bandwidth is available for each one of them.

C) Videoconference

Let's consider a scenario where the terminal dedicated for videoconference (for example a portable one) supplies separate information on the quality available for the audio and video services, from the best case of high-quality audio and video availability to the worst case of no audio and video availability (intermediate cases being, for example, degraded low or medium-quality audio and video availability or even no video, only low-quality audio availability). As compared to the previous example, in this scenario the information on the audio service is not independent of the information on the video service because the two services are in actual fact two "subservices" of the same service and not two separate services. The Availability Manager on Terminal 8 will hence have to proceed to displaying information regarding availability, first making a total calculation of the bandwidth occupied by the sum of the two "subservices" and deciding with an appropriate algorithm in which combination the bandwidth declared available by the gateway can be used for making the audio and video services available simultaneously.

Figure 3:
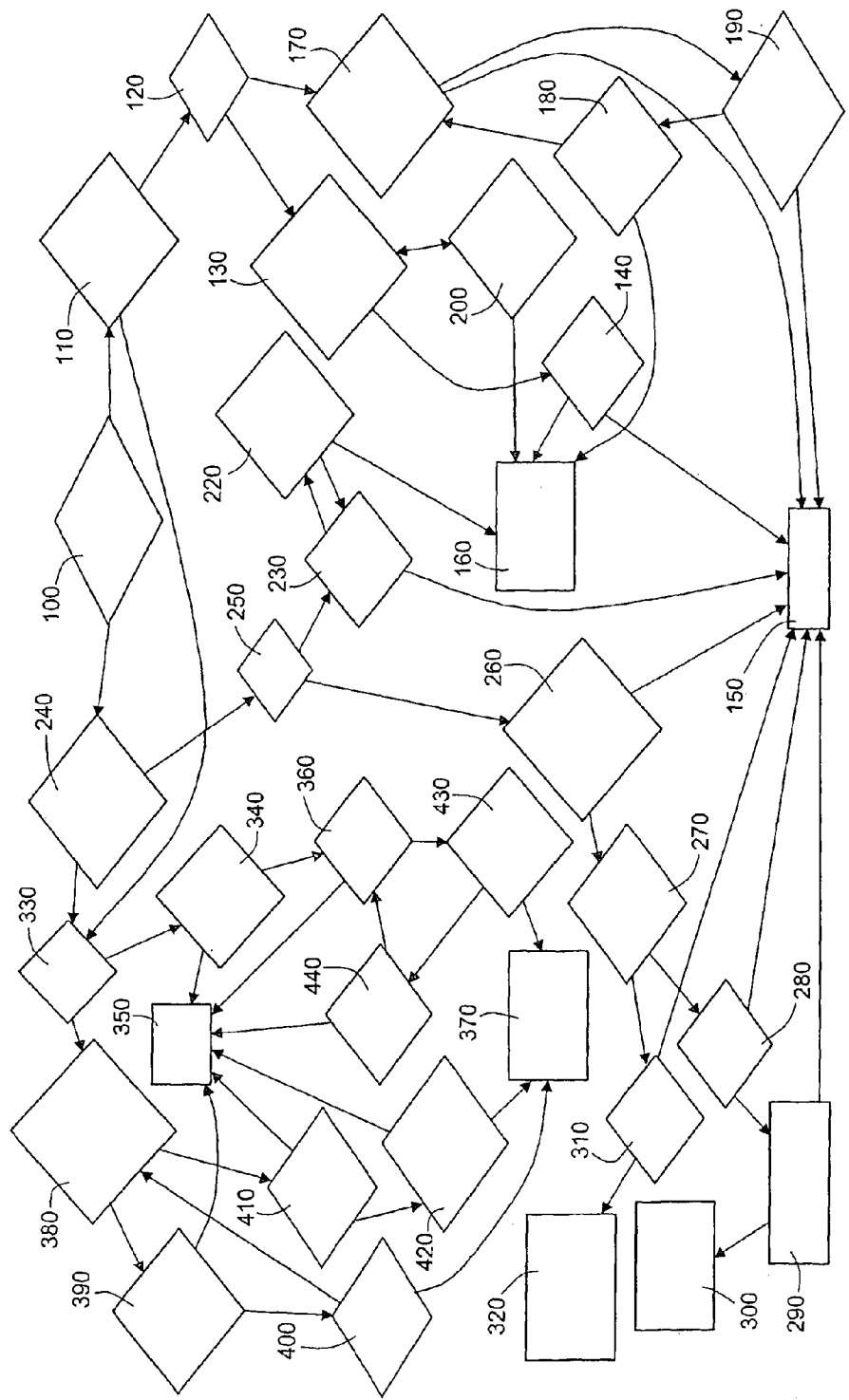
FIG. 3 shows a flowchart relating to the present invention.

FIG. 3 shows a flowchart of the steps performed to update the visual indication of the quality available for a service upon turning-on a customer terminal 2. A first general description of the flowchart is given, followed by a detailed description of the different steps thereof.

For simplicity of description, the flowchart has been drawn up assuming that the service is available at a single quality. Therefore, when availability of bandwidth is checked, in actual fact this check is made by comparing not just one, but rather three bandwidth thresholds necessary for running the application at three different levels of quality. Likewise, when the application is run, this can take place at three levels and will be translated adequately by the terminal into an indication on the display).

Besides, the flowchart starts from the terminal, which, in the architecture described previously, is associated to the individual application in a static way thanks to the information contained in the Application Data Repository.

In broad outline, the first point of discrimination is whether the service is managed by the service provider (such as VoIP) or by the user (such as "Skype" software for peer-to-peer telephony). In either case, the second point of discrimination is whether the service is or not at a guaranteed quality. It should be noted that the algorithm is generalized to the fact that also the service managed by the service provider can be of non-guaranteed quality, i.e., the possibility of the best effort is considered in both cases.

In the case where priority does not have to be guaranteed, the available bandwidth is compared (taking into account the fact that there may exist active service with guaranteed priority) with the requested bandwidth, and a response is issued on the possibility of providing the service. According to this response, the corresponding code is sent to the user terminal, which then translates it into an indication on the display.

In any case, based on this information, a check is also made to verify that the user terminal is not provided with another network interface that would enable use of a physical link having higher bandwidth availability. In this case, it will be necessary for the user terminal to receive a notification of change of physical interface to enable provision of the service.

Instead, in the case where there is a service for which the priority has to be guaranteed, the consensus for availability and hence for provision of the service must pass through the verification that the services being provided simultaneously have not an equal or higher priority. If this occurs, the service which, albeit having an equal priority, requests the availability in a subsequent moment of time is not authorized (i.e., the service already started is not interrupted). Even in this case, however, a check is made that another second network interface which can be used for the service that has requested use of the resource is available on the user terminal.

With reference now to FIG. 3, initially the gateway 3 verifies whether the user terminal 2 (that has been turned on and has established a connection with the gateway 3) in the customer premises belongs to the user or to a service provider 4 (block 100). If the user terminal 2 belongs to the user, the gateway 3 performs the operations described hereinafter with reference to block 240, whereas if the user terminal 2 belongs to the service provider 4, the gateway 3 verifies whether the service(s) available at the user terminal 2 is (are) of the user or of the service provider 4 (block 110). If the service(s) is (are) of the user, the gateway 3 performs the operations described hereinafter with reference to block 330, whereas if the service(s) is (are) of the service provider 4, the gateway 3 verifies whether service priority is to be guaranteed (block 120).

If so, the gateway 3 verifies whether other services are in progress on the same communications link of the customer-premises network 1 with higher guaranteed service priority (block 130). If so, the gateway 3 verifies whether the user terminal 2 has another integrated or integrable network interface (block 200), and if so the gateway 3 performs once again the operations described previously with reference to block 130 to verify if other services are in progress on the same communications link associated with this interface with higher priority.

The gateway performs this kind of feedback for any available interface, and exits from this cycle when there are no other available physical connections to be potentially used. In this case, the gateway 3 sends to the user terminal 2 an appropriate code indicating the impossibility of accessing the service, which is converted by the user terminal 2 into a visual indication for the user (block 160).

If there isn't any other service in progress on the same communications link of the customer-premises network 1 with higher guaranteed service priority, the gateway 3 verifies whether the bandwidth availability of the communications link of the customer-premises network 1 is compatible with the service priority to be guaranteed (block 140). If so, the gateway 3 sends to the user terminal 2 an appropriate code indicating the available service quality, which is converted by the user terminal 2 into a visual indication for the user (block 150), otherwise the gateway 3 performs the operations previously described with reference to block 160.

Coming back to block 120, if the service priority is not to be guaranteed, the gateway 3 verifies whether other services are in progress on the same communications link of the customer-premises network 1 with higher guaranteed service priority (block 170). If not, the gateway 3 performs the operations previously described with reference to block 150, otherwise the gateway 3 verifies whether the bandwidth availability of the communications link of the customer-premises network 1 is enough to provide the service (block 190). If so, the gateway 3 performs the operations described previously with reference to block 150, otherwise the gateway 3 verifies whether the user terminal 2 has another integrated or integratable network interface (block 180). If not, the gateway 3 performs the operations described previously with reference to block 160, otherwise the gateway 3 performs the operations described previously with reference to block 170.

This feedback architecture (blocks 170→190→180→170) allows to perform a number of cycles corresponding to the number of available interfaces, stopping and going to block 160 when no other interfaces are available.

Coming back to block 100, if the user terminal 2 belongs to the user, the gateway 3 verifies whether the service(s) available at the user terminal 2 is (are) of the user or of the service provider 4 (block 240). If the service(s) is (are) of the service provider 4, the gateway 3 verifies whether the service priority is to be guaranteed (block 250). If not, the gateway 3 verifies whether the bandwidth availability of the communications link of the customer-premises network 1 is enough to provide the service (block 230). If not, the gateway 3 verifies whether the user terminal 2 has another integrated or integrable network interface (block 220), and if so the gateway 3 performs once again the operation previously described with reference to block 230 to verify if the bandwidth availability is enough to provide the service. The gateway 3 performs this kind of feedback for any available interfaces, and exits from this cycle when there is no bandwidth availability for the service. In this case, the gateway 3 performs the operations previously described with reference to block 160. If instead the bandwidth availability is enough to provide the service, the gateway 3 performs the operations previously described with reference to block 150.

Coming back to block 250, if the service priority is to be guaranteed, the gateway 3 verifies whether other services are in progress on the same communications link of the customer-premises network 1 with higher guaranteed service priority (block 260). If not, the gateway 3 performs the operations described previously with reference to block 150, otherwise the gateway 3 verifies whether the service(s) available at the user terminal 2 is (are) of the user or of the service provider 4 (block 270). If the service(s) is (are) of the service provider 4, the gateway 3 verifies whether there is bandwidth available for the service (block 280). If so, the gateway performs the operations described previously with reference to block 150, otherwise the gateway 3 starts a negotiation procedure with a QoS server or assigns the intervention to the customer (block 290). If the negotiation gives a negative answer, the gateway 3 sends to the user terminal 2 an appropriate code indicating the impossibility of accessing the service, which is converted by the user terminal 2 into a visual indication for the user (block 300), whereas if the negotiation gives a positive answer, the gateway 3 performs the operations described previously with reference to block 150.

If instead the service(s) is (are) of the user, the gateway 3 verifies whether the bandwidth availability is enough to provide the service (block 310). If so, the gateway 3 performs the operations described previously with reference to block 150, otherwise the gateway 3 sends to the user terminal 2 an appropriate code indicating the available quality of the service of the service provider, which code is converted by the user terminal 2 into a visual indication for the user, and at the same time sends an appropriate code indicating unavailability of the service of the user (the service of the user originally having a high priority) (block 320).

Coming back to block 240, if the service(s) is (are) of the user, the gateway 3 verifies whether the service priority is to be guaranteed (block 330). If not, the gateway 3 verifies whether other services are in progress on the same communications link of the customer-premises network 1 with guaranteed service priority (block 340). If not, the gateway 3 sends to the user terminal 2 an appropriate code indicating the available service quality, which is converted by the user terminal 2 into a visual indication for the user (block 350), otherwise the gateway 3 verifies whether there is bandwidth available for a best-effort service priority (block 360). If so, the gateway 3 performs the operations described previously with reference to block 350, otherwise the gateway 3 verifies whether the user terminal 2 has another integrated or integrable network interface (block 430).

If not, the gateway 3 sends to the user terminal 2 an appropriate code indicating the impossibility of accessing the service, which is converted by the user terminal 2 into a visual indication for the user (block 370), whilst if so, the gateway 3 verifies again whether other services are in progress on the same communications link of the customer-premises network 1 with guaranteed service priority (block 440). If not, the gateway 3 performs the operations described previously with reference to block 350, otherwise the gateway 3 performs once again the operations described previously with reference to block 360 to verify if any additional interface is available. This feedback architecture (blocks 440→360→430→440) allows to perform a number of cycles corresponding to the number of available interfaces, stopping and going to block 370 when no other interfaces are available.

Coming back to block 330, if the service priority is to be guaranteed, the gateway 3 verifies whether other services are in progress on the same communications link of the customer-premises network 1 with higher guaranteed service priority (block 380). If so, the gateway 3 verifies whether the bandwidth availability of the communications link of the customer-premises network 1 is compatible with the service priority to be guaranteed (block 390). If so, the gateway 3 performs the operations described previously with reference to block 350, otherwise the gateway 3 verifies whether the user terminal 2 has another integrated or integratable network interface (block 400). If so, the gateway 3 performs the operations described previously with reference to block 380, if not, the gateway 3 performs the operations described previously with reference to block 370.

Coming back to block 380, if there are no services in progress on the same communications link of the customer-premises network 1 with higher guaranteed service priority, the gateway 3 verifies whether the bandwidth availability of the communications link of the customer-premises network 1 there is enough to provide the service (block 410). If so, the gateway 3 performs the operations described previously with reference to block 350, otherwise the gateway 3 verifies whether the user terminal 2 has another integrated or integratable network interface (block 420). If so, the gateway 3 performs the operations described previously with reference to block 350, otherwise (output NO from block 420), the gateway performs the operations described previously with reference to block 370.

The advantages of the present invention are evident from the foregoing. In particular, it is emphasized that the visual indication of the availability of the services at the user terminal is provided in a single and simple modality, without the user having to be concerned with complex indications of network parameters (wireless coverage, bandwidth, priority, etc.).

Finally, it is clear that numerous modifications and variants can be made to the present invention, all falling within the scope of the invention, as defined in the appended claims.

The invention claimed is:

1. A method for providing a user with an indication of service quality associated with a plurality of services accessible by a user by means of a user terminal, the user terminal being connected to a residential gateway, thereby forming a home network at the user's premises, and the residential gateway being connected to a service provider via a public communication network, comprising:

sending from said user terminal to said residential gateway a request of availability of said plurality of services; and at said residential gateway:

determining a service bandwidth demand associated with each service of said plurality of services;

determining a bandwidth availability in the home network by monitoring bandwidth occupancy in the home network;

determining a bandwidth availability in the public communication network by carrying out a negotiation procedure with the service provider;

determining a service quality available for each service of said plurality of services based on the service bandwidth demand, the bandwidth availability in the home network, and the bandwidth availability in the public communication network for the respective service;

sending to the user terminal an indication of the service quality available for each service of said plurality of services; and periodically updating the indication of the service quality available for each service of the plurality of services, taking into account the activation of one or more services of the plurality of services.

2. The method of claim 1, wherein at least a further user terminal is connected to the residential gateway and wherein each of said user terminal and said further user terminal is suitable to access at least a respective service of said plurality of services.

3. The method of claim 1, wherein determining a service quality comprises:

determining the service quality among a number of possible service quality levels.

4. The method of claim 1, further comprising providing the user with an indication of said service quality available for each service of said plurality of services determined by the residential gateway, wherein said indication is a visual indication displayed on the user terminal or on a device connected thereto.

5. The method of claim 4, wherein providing the user with an indication of the service quality comprises:

displaying a broken line made up of a number of segments that are selectively illuminable based on the service quality.

6. The method of claim 1, further comprising:

generating a service availability request;

wherein said bandwidth availability is determined in response to the service availability request.

7. The method of claim 6, wherein the service availability request is generated by the user terminal upon its switching on.

8. The method of claim 1, wherein determining the service bandwidth demand for each service is based on service information comprising:

type of the first communications link;

service priorities; and service bandwidth demand for each service priority.

9. The method of claim 1, wherein the service bandwidth demand and the bandwidth availability are determined by the residential gateway.

10. The method of claim 1, wherein the service quality is determined by the residential gateway.

11. A software module, capable of being loaded and run in a residential gateway and a user terminal to cooperate in implementing the method according to claim 1.

12. A system for providing a user with an indication of service quality for a plurality of services accessible by a user by means of a user terminal, the user terminal being connected to a residential gateway, thereby forming a home network at the user's premises, and the residential gateway being connected to a service provider via a public communication network, comprising:
- a residential gateway configured to receive from said user terminal a request of availability of said plurality of services, determine a service bandwidth demand associated with each service of said plurality of services, determine a bandwidth availability in the home network by monitoring bandwidth occupancy in the home network, determine a bandwidth availability in the public communication network by carrying out a negotiation procedure with the service provider, and determine and send the user terminal a service quality available for each service of said plurality of services based on the service bandwidth demand for the respective service, the bandwidth availability in the home network, and the bandwidth availability in the public communication network; and
- said user terminal configured to receive from the residential gateway an indication of the service quality available for each service of said plurality of services,
- wherein the user terminal is further configured to receive an updated indication of the service quality available for each service of the plurality of services, taking into account the activation of one of more services of the plurality of services.

13. The system of claim 12, wherein the user terminal comprises an availability module configured to send the residential gateway a service availability request, and the residential gateway is configured to determine the bandwidth availability upon receiving the service availability request from the user terminal.

14. The system of claim 13, wherein the user terminal is configured to send the service availability request upon its switching on.

15. The system of claim 12, wherein the residential gateway is configured to determine the service bandwidth demand for each service based on service information comprising:
- type of the first communications link;
- service priorities; and
- service bandwidth demand for each service priority.

16. The system of claim 15, wherein the service bandwidth demand comprises average and peak bandwidth demand.

17. The system of claim 12, wherein the user terminal is configured to cause an indication of the service quality available for each service to be displayed on its own display or on a display connected thereto.

18. The system of claim 12, wherein the residential gateway is further configured to cause the indication of the service quality available for each service to be periodically updated.

19. The system of claim 12, wherein the service quality is determined among a number of possible service quality levels.

20. The system of claim 12, wherein the user terminal is configured to cause a broken line made up of a number of segments selectively illuminable based on the service quality to be displayed.

21. The system of claim 12, comprising at least a further user terminal connected to the residential gateway.

22. A method for providing a user with an indication of availability of a service accessible by a user via a user terminal, the user terminal being connected to a residential gateway, thereby forming a home network at the user's premises, and the residential gateway being connected to a service provider via a public communication network, the method comprising:
- receiving from the user terminal a service availability request of availability of a plurality of services;
- in response to the service availability request received from the user terminal:
  - determining a service bandwidth demand associated with each service of said plurality of services;
  - determining a bandwidth availability in the home network by monitoring bandwidth occupancy in the home network;
  - determining a bandwidth availability in the public communication network by carrying out a negotiation procedure with the service provider;
  - determining a service availability for each service of said plurality of services based on the service bandwidth demand, the bandwidth availability in the home network, and the bandwidth availability in the public communication network;
  - sending to the user terminal an indication of the service availability for each service of said plurality of services;
  - periodically updating the indication of the service availability for each service of the plurality of services, taking into account the activation of one or more services of the plurality of services,
- wherein the user terminal and the residential gateway belong to a customer-premises network.

23. A system for providing a user with an indication of availability for each of a plurality of services accessible by a user via a user terminal, the user terminal being connected to a residential gateway, thereby forming a home network at the user's premises, and the residential gateway being connected to a service provider via a public communication network, wherein:
- the residential gateway is configured to determine, in response to the service availability request received from the user terminal:
  - a service bandwidth demand associated with each service of said plurality of services;
  - a bandwidth availability in the home network by monitoring the bandwidth occupancy in the home network;
  - a bandwidth availability in the public communication network by carrying out a negotiation procedure with the service provider;
  - a service availability for each service of said plurality of services based on the service bandwidth demand, the bandwidth availability in the home network, and the bandwidth availability in the public communication network;
- the residential gateway being further configured to send the determined service availability for each service to the user terminal; and
- the user terminal is configured to:
  - receive the service availability for each service from the residential gateway, and
  - receive an indication of the service availability for each service of the plurality of services,
- wherein the user terminal is further configured to periodically send a service availability request to the residential gateway, receive from the residential gateway an update of the service quality available for each service of the plurality of services and provide an update of the indication of the service quality available for each service of the plurality of services, taking into account the activation of one or more services of the plurality of services, and wherein the user terminal and the residential gateway belong to a customer-premises network.

* * * * *